P. J. TAYLOR.
MOTION PICTURE DEVICE.
APPLICATION FILED OCT. 28, 1914.
1,152,989.
Patented Sept. 7, 1915.
2 SHEETS—SHEET 1.
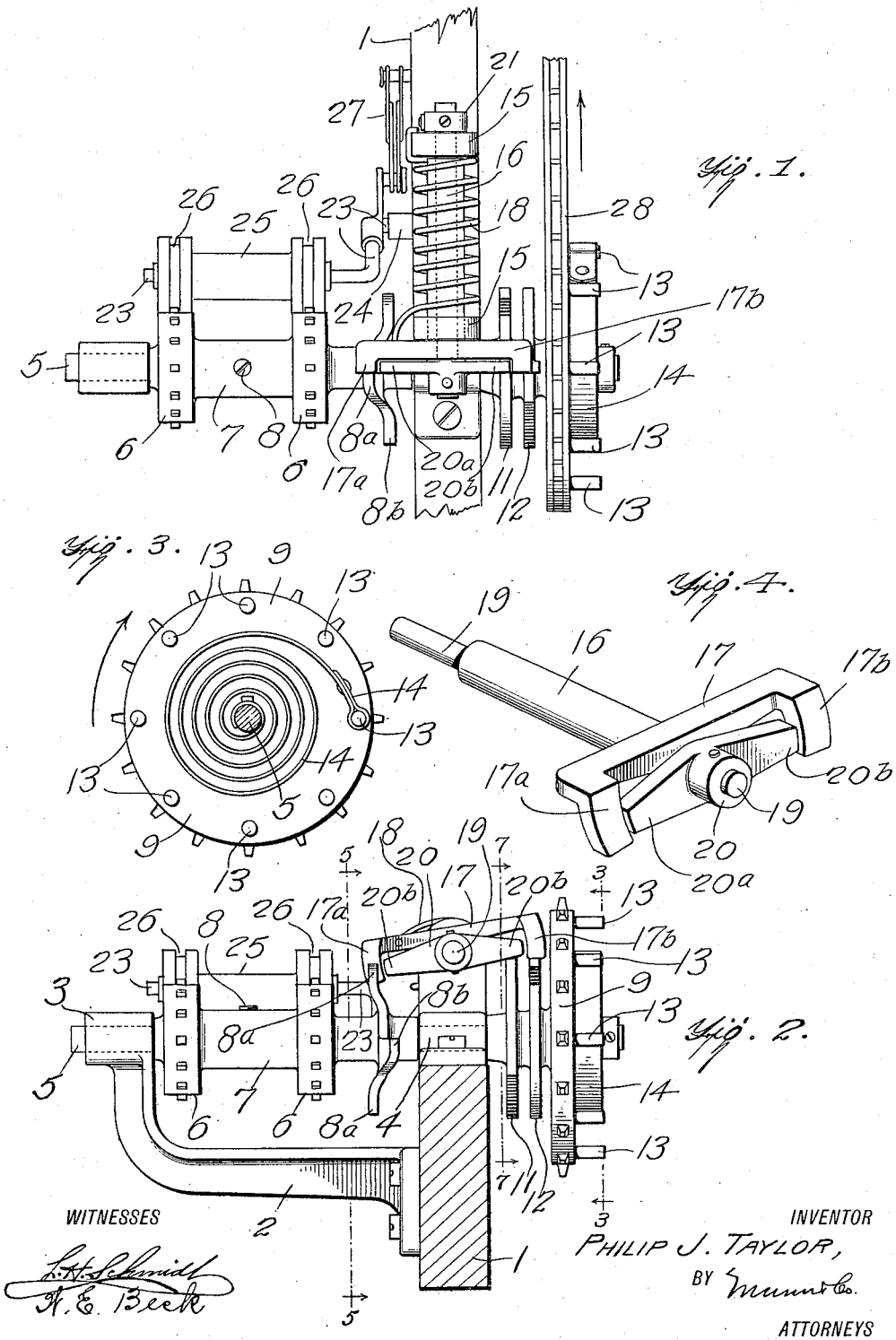
WITNESSES
L. H. Schmidt
H. E. Beek
INVENTOR
PHILIP J. TAYLOR,
BY Munn & Co.
ATTORNEYS P. J. TAYLOR.
MOTION PICTURE DEVICE.
APPLICATION FILED OCT. 28, 1914.
1,152,989.
Patented Sept. 7, 1915.
2 SHEETS—SHEET 2.
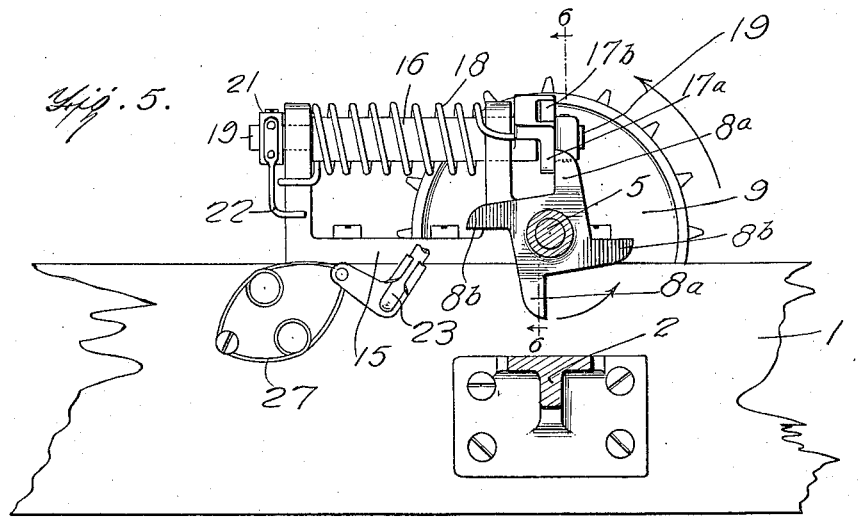
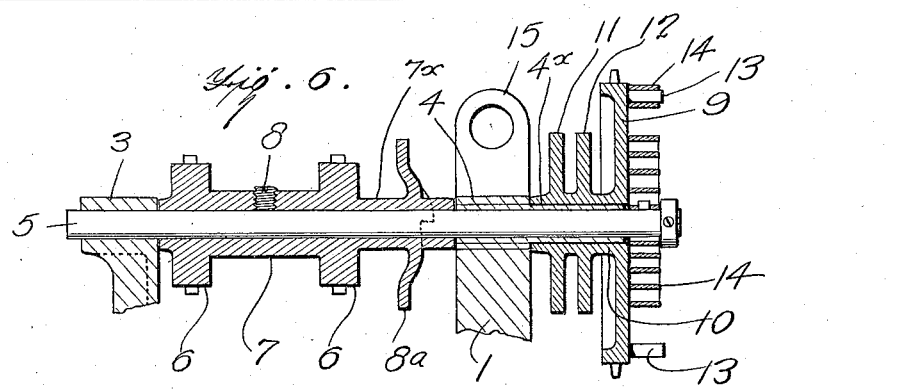
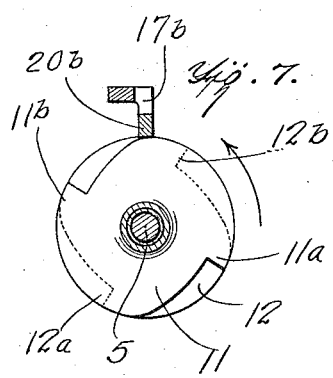
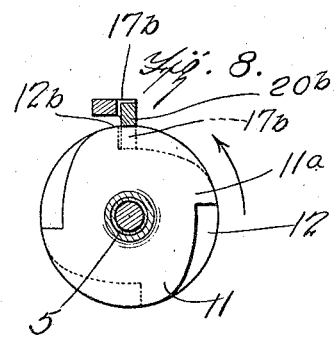
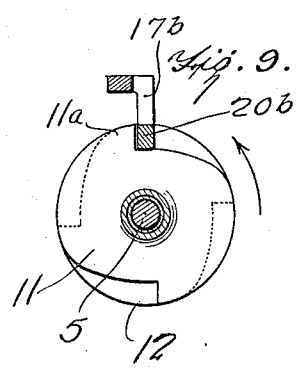
WITNESSES
L. H. Schmidt
H. E. Beck
INVENTOR
PHILIP J. TAYLOR,
BY Munn & Co
ATTORNEYS

UNITED STATES PATENT OFFICE.

PHILIP JACKSON TAYLOR, OF CAIRO, ILLINOIS.

MOTION-PICTURE DEVICE.

1,152,989.  Specification of Letters Patent.  Patented Sept. 7, 1915.

Application filed October 28, 1914. Serial No. 869,067.

*To all whom it may concern:*

Be it known that I, PHILIP J. TAYLOR, a citizen of the United States, and a resident of Cairo, in the county of Alexander and State of Illinois, have made certain new and useful Improvements in Motion-Picture Devices, of which the following is a specification.

My invention relates to improvements in motion picture devices and it consists in the combinations, constructions, and arrangement of parts hereinafter described and claimed.

An object of my invention is to provide a device for intermittently driving the sprocket wheel which feeds the film.

A further object of my invention is to provide a device of the type described in which the intermittent movement of the film is caused by the action of a spring, thus making the movement quicker and preventing the flicker which is attendant with devices of this kind when the latter are run slowly.

A further object of my invention is to provide a device of the kind which obviates the necessity of using a cutting shutter when the machine is being run slowly.

Other objects and advantages will appear in the following specification and the novel features of the device will be particularly pointed out in the appended claims.

My invention is illustrated in the accompanying drawings forming part of this application in which—

Figure 1 is a plan view of the film feeding mechanism, Fig. 2 is a front view thereof, a portion of the frame being shown in section, Fig. 3 is a section along the line 3—3 of Fig. 2, Fig. 4 is a perspective view of a portion of the escapement mechanism, Fig. 5 is a section along the line 5—5 of Fig. 2, looking in the direction of the arrows, Fig. 6 is a section along the line 6—6 of Fig. 5 looking in the direction of the arrows, and Figs. 7, 8 and 9 are sectional views along the line 7—7 of Fig. 2, showing the apparatus in different positions.

Referring now particularly to Figs. 2 and 6 I have shown therein a portion of the frame 1 upon which is mounted a bracket 2 having a bearing 3 at one end thereof. A bearing 4 is carried by the frame 1 and mounted in the bearings 3 and 4 is a shaft 5. As will be seen from Fig. 6 the bearing 4 is prolonged as shown at $4^x$ for a purpose hereinafter described.

Mounted on the shaft 5 are the sprocket wheels 6 which are joined by a common hub 7, the latter being secured to the shaft by means of a set screw 8 or in any other suitable manner. The hub 7 is prolonged as shown at $7^x$ and bears an escapement wheel having teeth $8^a$ arranged on opposite sides of the shaft, these teeth being bent in the manner shown in Figs. 1, 2 and 6 so as to lie in a common plane at right angles to the axis of the shaft 5. Similar teeth $8^b$ are provided which are bent in the opposite direction so that the ends of the teeth are substantially in the same plane, this plane being also at right angles to the shaft 5 and therefore parallel to the plane of the teeth $8^a$, but being offset from the plane of the teeth $8^a$ for a purpose hereinafter set forth.

Disposed on the extension $4^x$ of the bearing 4 is a sprocket wheel 9 whose hub 10 bears two cam wheels 11 and 12 respectively. The sprocket wheel 9 is provided with a series of laterally extending pins 13. To one of these pins is secured the end of a spiral spring 14 (see Figs. 3 and 6), the other end of the spiral spring 14 being secured to the shaft 5 which, as seen from Fig. 6, projects beyond the extended bearing $4^x$.

Carried by the frame 1 is a U-shaped bracket 15 in which is mounted for revolution a sleeve 16 (see Fig. 5). The sleeve bears at this outer end an escapement member 17 having laterally and downwardly extending end members $17^a$ and $17^b$ respectively, as shown in Fig. 4. A spring 18 is secured at one end to the escapement member 17 and at the other end to the bracket 15 (see Figs. 1 and 5) this spring tending to normally raise the end $17^a$ of the escapement member 17 and to normally keep the end $17^b$ depressed.

Extending loosely through the sleeve 16 is a shaft 19 which bears at its end an escapement member 20, the latter having end portions $20^a$ and $20^b$ respectively, which terminate short of the end portions $17^a$ and $17^b$, but which lie substantially in the same plane with the latter, as shown in Figs. 4 and 5. The shaft 19 extends through the bracket 15 and is provided on the end with a collar 21. A spring 22 which is fastened to this collar at one end and to the bracket 15 at the other end normally holds the end $20^a$ of the escapement member 20 in an upper position and the lower end 20ᵇ in a depressed position.

At 23 I have shown a shaft which is mounted in a bearing 24 carried by the framework 1, this shaft being Z-shaped and being provided with a guide roller 25 having grooves 26 arranged to register with the teeth of the sprocket wheel 6. The shaft 23 has an extension 23ˣ which is normally held by means of a spring 27 in such a position as to force the roller toward the sprocket. The roller, however, may be thrown back by rotating the shaft 23 into the dotted line position shown in Fig. 5.

From the foregoing description of the various parts of the device the operation thereof may be readily understood.

The guide roller 25 is thrown back into its dotted line position and the film is placed in position on the sprockets 6 after which the roller is brought forward so as to prevent the film from lifting the sprockets. The sprocket wheel 9 is turned by means of the chain 28 in the usual manner. This sprocket wheel may run to a manually operated sprocket or to a power driven sprocket (not shown). As the sprocket wheel 9 is rotated the cam wheels 11 and 12 are also rotated and the spring 14 is tightened. The cam 11 is provided, as shown in Figs. 7, 8 and 9, with shoulders 11ª, 11ᵇ situated at points 180° apart while the cam wheel 12 is provided with shoulders 12ª and 12ᵇ respectively situated at 180° apart, but at 90° from the shoulders 11ᵇ. The cam wheel 11 is in a position to engage the end 20ᵇ of the escapement member 20, while the cam wheel 12 is in position to engage the end 17ᵇ of the escapement member 17 (see Fig. 2). The ends 17ª and 20ª of the escapement members 17 and 20 are in position to be engaged by the teeth 8ª and 8ᵇ respectively of the escapement wheel. One of these escapement members 17 or 20 is always in the path of a tooth of the escapement wheel.

Consider Fig. 2. In this figure the sprocket wheel 9 is supposed to be rotating clockwise when viewed from the right hand side, that is to say, when viewed in the direction indicated by the arrows on the section line 3—3, as shown in Fig. 3. This, as stated, puts a tension on the spring 14 and hence on the shaft 5, but the latter cannot revolve because the escapement tooth 8ª is held by the portion 17ª of the escapement member 17, because the opposite end 17ᵇ is held in an upper position by means of the cam member 12 (see Fig. 7). When, however, the shoulder 12ᵇ is reached then the end 17ᵇ of the member 17 will drop down, thereby lifting the end 17ª and permitting the shaft to revolve until the tooth 8ᵇ comes into engagement with the end 20ᵇ of the escapement member 20 which is now forced downwardly into the path of the tooth 8ᵇ by reason of the engagement of the end 20ᵇ with the cam 11. As the sprocket wheel 9 turns still farther the escapement member 20ᵇ will shift its position when the shoulder 11ª is reached (see Fig. 9) and the end 17ª of the escapement member 17 will be forced downwardly into the path of a tooth 8ª. Of course, when the member 20 is shifted so as to be withdrawn from the path of the tooth 8ᵇ the shaft 5 bearing the sprocket 6 will be revolved a quarter of a revolution or until the escapement wheel comes into contact with the escapement member 17. The movement of the shaft 5 under the action of the spring 14 will tend to restore the spring to its original condition so that the spring 14 is never completely wound up. The sprocket wheels 6 which draw the film forward, of course, move faster than the sprocket 9, and this motion is intermittent motion of a quarter of a revolution, while the sprocket wheel 9 is rotated continuously.

The tension of the spring 14 may be changed by shifting the end of the spring 14 from one of the points 13 to another, these points being located at convenient distances, as shown in Fig. 3, in order to provide the proper tension for the spring.

The device is comparatively simple, inexpensive to make, and yet positive in operation and provides a means of quickly shifting the film intermittently so as to obviate the flicker which is observed in other devices which run the film slowly whenever the machine is turned slowly. Since the movement of the sprocket wheels 6 which feed the film occurs under action of the spring and this action takes place very quickly, it is immaterial whether the device be run at a slow or fast speed, the movement of the film being practically the same. Therefore the machine may be run at a comparatively slow rate of speed, while the actual movement of the film will be at substantially the same speed as if the machine were run faster. The time between these movements, however, will of course, depend upon the rate at which the machine is run. The construction described provides means for running a shorter length of film than could be run by devices in which the actual movement of the film is in proportion to the rate at which the machine is turned so that in fact, four hundred or six hundred feet of film will go, as far as results are concerned, as far as a thousand feet of film in machines in which the actual movement of the film is in proportion to the rate at which the drive wheel is run.

I claim:—

1. In a moving picture machine, a shaft, a drive wheel mounted to rotate about the axis of the shaft, a spring connecting said drive wheel with said shaft, a pair of sprocket wheels arranged to engage the film, an integral sleeve carried by said sprockets, said sleeve being arranged to fit over said shaft, a stop member carried by said sleeve, and movable stop members actuated by the movement of said drive wheel for intermittently engaging said first named stop member, thereby causing the intermittent rotation of the sprocket wheels.

2. In a moving picture machine, a rotatable shaft, a drive wheel mounted to rotate about the axis of the shaft, a spring connecting said drive wheel with said shaft, cams carried by said drive wheel, a sleeve secured to said shaft, integral sprocket wheels carried by said sleeve, an escapement wheel carried by said sleeve, and escapement members adapted to be moved by said cams into and out of the path of the escapement wheel.

3. In a moving picture machine, a rotatable shaft, a drive wheel mounted to rotate about the axis of the shaft, a spring connecting said drive wheel with said shaft, cams carried by said drive wheel, a sleeve secured to said shaft, integral sprocket wheels carried by said sleeve, an escapement wheel carried by said sleeve, said escapement wheel having a plurality of sets of oppositely bent teeth, and a pair of pivoted escapement members arranged to be moved by said cams into and out of the path of the oppositely bent teeth on the escapement wheel.

4. In a moving picture machine, a frame, an extended bearing carried by said frame, a shaft mounted for rotation in said extended bearing, a drive wheel mounted for rotation on the exterior of said extended bearing, said drive wheel being provided with a hub, a pair of integral cam wheels carried by said hub, a spring connecting said drive wheel with said shaft, a sleeve surrounding a portion of said shaft, means for securing said sleeve to said shaft, integral sprocket wheels carried by said sleeve, an integral escapement wheel carried by said sleeve, said escapement wheel having two sets of oppositely bent teeth, a pair of pivoted escapement members carried by said frame, an individual spring for normally holding one end of each of said escapement members in engagement with one of said cams, the opposite end of each of said escapement members being arranged to project into the path of one of the sets of oppositely bent teeth on the escapement wheel, said cams being arranged to cause a movement of one end of one of the escapement members outward and from the axis of the shaft and to permit the simultaneous movement of the companion member toward the axis of the shaft.

5. In a moving picture machine, a frame, an extended bearing carried by said frame, a shaft mounted for rotation in said extended bearing, a drive wheel mounted for rotation on the exterior of said extended bearing, said drive wheel being provided with a hub, a pair of integral cam wheels carried by said hub, a spring connecting said drive wheel with said shaft, a sleeve surrounding a portion of said shaft, means for securing said sleeve to said shaft, integral sprocket wheels carried by said sleeve, an integral escapement wheel carried by said sleeve, said escapement wheel having two sets of oppositely bent teeth, and a pair of pivoted escapement members carried by said frame.

6. In a moving picture machine, a frame, an extended bearing carried by said frame, a shaft mounted for rotation in said extended bearing, a drive wheel mounted for rotation on the exterior of said extended bearing, said drive wheel being provided with a hub, a pair of integral cam wheels carried by said hub, a spring connecting said drive wheel with said shaft, a sleeve surrounding a portion of said shaft, means for securing said sleeve to said shaft, integral sprocket wheels carried by said sleeve, an integral escapement wheel carried by said sleeve, said escapement wheel having two sets of oppositely bent teeth, a pair of pivoted escapement members carried by said frame, and an individual spring for normally holding the end of each of said escapement members in engagement with one of said cams.

7. In a moving picture machine, a frame, an extended bearing carried by said frame, a shaft mounted for rotation in said extended bearing, a drive wheel mounted for rotation on the exterior of said extended bearing, said drive wheel being provided with a hub, a pair of integral cam wheels carried by said hub, a spring connecting said drive wheel with said shaft, a sleeve surrounding a portion of said shaft, means for securing said sleeve to said shaft, integral sprocket wheels carried by said sleeve, an integral escapement wheel carried by said sleeve, said escapement wheel having two sets of oppositely bent teeth, a pair of pivoted escapement members carried by said frame, an individual spring for normally holding the end of each of said escapement members in engagement with one of said cams, and the opposite end of each of said escapement members being arranged to project into the path of one of the sets of oppositely bent teeth on the escapement wheel.

PHILIP JACKSON TAYLOR.

Witnesses:
  Wm. Taylor,
  H. L. Skiles.